United States Patent [19]

Olson

[11] 4,337,401
[45] Jun. 29, 1982

[54] ADAPTIVE LOAD SHEDDING

[75] Inventor: Harold J. Olson, Hawthorn Woods, Ill.

[73] Assignee: Honeywell Inc., Minneapolis, Minn.

[21] Appl. No.: 228,020

[22] Filed: Jan. 23, 1981

[51] Int. Cl.³ .............................................. H02J 3/00
[52] U.S. Cl. ...................................... 307/39; 364/492
[58] Field of Search ...................... 307/35, 39, 40, 41; 364/492; 236/1 B, DIG. 8

[56] References Cited

U.S. PATENT DOCUMENTS

| | | | |
|---|---|---|---|
| 4,064,485 | 12/1977 | Leyde | 340/147 R |
| 4,100,428 | 7/1978 | Delisle et al. | 307/97 |
| 4,125,782 | 11/1978 | Pollnow, Jr. | 307/35 |
| 4,135,101 | 1/1979 | Young et al. | 307/39 |
| 4,136,392 | 1/1979 | Westphal et al. | 364/492 |
| 4,147,296 | 4/1979 | Spethmann | 236/1 B |

Primary Examiner—Michael L. Gellner
Attorney, Agent, or Firm—Trevor B. Joike

[57] ABSTRACT

A load shedding system for shedding loads within a building to maintain power demand within the building below a predetermined level (i.e. current demand limit) wherein the loads which can be shed are those which affect or control actual conditions in the zones associated with the loads is disclosed having condition sensors for sensing conditions such as temperature in the zones of a building and a control apparatus responsive to the conditions being sensed by the condition sensors and connected to the loads for shedding the loads in order of those loads affecting or controlling the zones having the least deviation between the actual condition and a desired condition being shed first and those loads affecting or controlling those zones having the most deviation being shed last to maintain power demand below the predetermined level.

6 Claims, 5 Drawing Figures

Fig. 5

COMFORT FAIRNESS SHED ORDER

REORDERS ELECTRIC LOADS (eg HVAC FAN MOTORS) ON BASIS OF DEVIATION OF AFFECTED ROOM CONDITION (eg TEMPERATURE OR HUMIDITY) FROM A "COMFORT" INDEX

| COL 1 LOAD ITEM | COL 2 "COMFORT" INDEX | COL 3 MEASURED OR "ASSIGNED" ROOM CONDITION | COL 4 CALCULATED ABSOLUTE DEVIATION FROM "COMFORT" INDEX (COL 2 – COL 3) | COL 5 SORTED DEVIATION VALUES | COL 6 REORDERED LOAD ITEMS |
|---|---|---|---|---|---|
| 1 | 73 | 65 | 8 | 0 | 6 |
| 2 | 73 | 66 | 7 | 1 | 7 |
| 3 | 73 | 67 | 6 | 3 | 8 |
| 4 | 73 | 78 | 5 | 5 | 4 |
| 5 | 73 | 80 | 7 | 6 | 3 |
| 6 | 73 | 73 | 0 | 7 | 2 |
| 7 | 80 | 79 | 1 | 7 | 5 |
| 8 | 65 | 68 | 3 | 8 | 1 |

COL 6: ← ADD / SHED →

: 1

ADAPTIVE LOAD SHEDDING

BACKGROUND OF THE INVENTION

The present invention relates to a load shedding system for shedding the loads of a building as the power consumed by those loads approaches a predetermined level and, more particularly, to a load shedding system in which those loads which affect a condition such as temperature and/or humidity in the spaces of a building are shed in the order of those loads associated with the space having the least deviation between the actual condition and a desired condition being shed first and those loads having the most deviation being shed last to maintain the average energy consumption rate below a predetermined level (i.e. current demand limit).

In recent years, with the renewed, increased interest in energy conservation, and particularly as a result of increases in the cost of fuels and a concomitant decrease in their availability it has become desirable and economically responsible to operate the various loads within a building in an energy conserving manner. Such buildings may, for example, comprise a plurality of floors each floor having both exterior and interior areas or offices (which may be referred to as zones or spaces) and each floor having one or more fan systems for supplying conditioned air to these zones. The conditions typically controlled by such systems are temperature and humidity.

Power companies have recognized the need for conserving fuel to keep down the cost of supplying power to their customers and to charge back to their customers an amount of money to cover the cost of extra equipment which is required to meet their customer's needs during those times of high energy demand. The capacity of the power companies' power generation plants is strained, particularly on those days having extreme temperatures. Extra or higher capacity equipment which normally is not fully utilized is required on such days in order for the power companies to meet the demands of all of their customers. In order to recover the cost of this extra capacity, power companies charge their customers not only for the power used during the billing period but also charge an extra amount based upon the highest average actual power consumption rate measured over a demand interval of time, usually selected to be 15 minutes, during the billing period. In order to minimize normal billing charges for power consumption, buildings have turned to such systems as load cycling for maintaining total power consumption during the billing period as low as possible and yet maintain a degree of comfort within the building. However, in order to minimize the extra charges resulting from high energy consumption rates, buildings use load shedding systems in which average power usage over a demand interval is monitored for shedding or turning off loads as the actual rate approaches a predetermined rate.

Heretofore, load shedding systems have either relied upon sequential shed tables or rotational shed tables. In sequential shed tables, the order of shedding remains fixed. That is, as the actual power consumption within a building approaches a given demand limit, load 1 is always shed first and load 2, if needed, is then shed next and so on. Restoration of loads is done in reverse order. Following restoration of all loads, subsequent shedding begins again with load 1. Conceivably, the loads at the end of the table may never be shed. In the rotational shed tables, on the other hand, the first time a shed routine is performed, load 1 through load n are shed first; but if the next action is an add (restore) action, load $1+n\pm1$ (if previously shed) will be first restored. If the next action is a shed action, load $1+n+1\pm1$ will be shed and so on. In any case, the order in which loads are shed in these two routines is not adaptive but is fixed at the time of either assembly or initialization. Only load deletions or reassignments at a later time affect the load shedding sequence. Consequently, unacceptable thermal or humidity discomfort often accompanies load shedding operations as the effects of sun, wind and internal latent heat within the building vary throughout the day or night.

SUMMARY OF THE INVENTION

Instead of a fixed load shedding sequence for shedding loads as the actual demand for power of a building or complex of buildings approaches a predetermined level, the present system will shed those loads associated with spaces having the least deviation between the actual condition such as temperature and the desired condition first and those loads having the most deviation last. Thus, the loads associated with those spaces which are the most uncomfortable, i.e. which require the most treatment of the air supplied thereto, will not be shed until the loads associated with those spaces which require the least treatment of the air supplied thereto are shed and then only to maintain power consumption below the current demand limit. In this manner, comfort fairness is maintained within the heating and cooling zones of a building or complex of buildings.

The load shedding system according to this invention, therefore, has condition sensors located within the zones of the building (or building complex) and a control system connected to the condition sensors for shedding those loads which affect conditions within the zones in the order of the loads associated with those zones having the least deviation between the actual condition within the zone and the desired condition being shed first and those loads associated with those zones having the most deviation being shed last to maintain power consumption within the building below a predetermined level.

BRIEF DESCRIPTION OF THE DRAWINGS

These and other advantages and features will become more apparent from a detailed consideration of the invention when taken in conjunction with the drawings in which:

FIG. 5 shows how the loads are reordered for shedding purposes.

DETAILED DESCRIPTION

Figure 1:
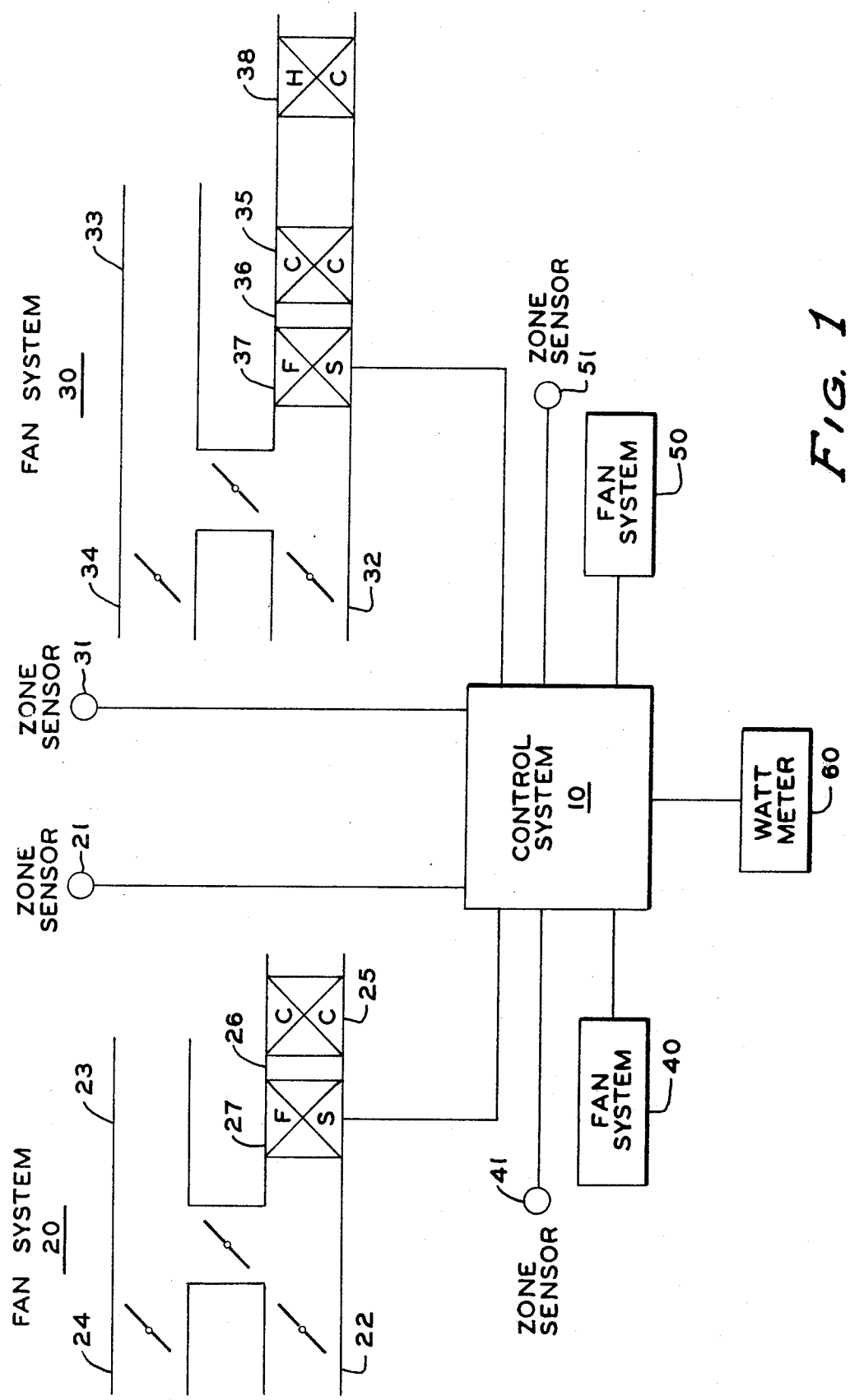
FIG. 1 shows a control system for controlling the shedding of those loads which affect conditions within the zones of a building.

FIG. 1 shows the type of air handling system in which the load shedding system according to the present invention can be used. Control system 10 is connected by various lines or connecting means to individual condition sensors, which may be humidistats or thermostats 21, 31, 41 and 51 associated with a respective representative number of fan systems 20, 30, 40 and 50 which supply treated air to the zones associated therewith. Although other loads besides fans may be shed, building and comfort requirements are often such that fans are the only good candidates of load shedding routines. For example, lighting cannot be shed during occupancy and chillers cannot easily be shed. Thus, control system 10 is shown connected to fan systems 20, 30, 40 and 50 as the only loads and sensors 21, 31, 41 and 51 as the inputs. It should also be recognized that if a fan is turned off, the heat added to the cooling fluid circulated through cooling coils is drastically reduced and the chiller needs much less power to maintain the desired refrigerant head.

Fan systems 20, 30, 40 and 50 supply air to the zones connected to their respective discharge ducts and corresponding sensors 21, 31, 41 and 51 are located to provide comfort indications of the zones associated with their respective fan systems. Fan systems 20 and 30 are shown in more detail but the other fan systems of the building or building complex such as fan systems 40 and 50, may be similar.

Air supplied to fan system 20 is derived from outdoor air duct 22 and return air duct 23. A portion of the return air is exhausted from the building by exhaust duct 24. Since fan system 20 only contains cooling coil 25 in supply duct 26, fan system 20 may typically be used for supplying air to the interior zones or spaces of a building because these spaces typically represent a constant cooling load regardless of the time of year. Fan 27 is located within supply duct 26 to discharge air to the zones supplied thereby. Fan 27 and sensor 21 are suitably connected to control system 10.

The exterior zones which face the outside of the building represent a cooling load during the summer and a heating load during the winter and may be supplied with air from a fan system such as fan system 30. Zone sensor 31 is connected to control system 10 as is fan 37 which discharges air to the zones to which fan system 30 is connected. Cooling coil 35 and heating coil 38 are located within supply duct 36 to properly condition the air supplied by fan 37. Fan 37 is supplied with air from outdoor air duct 32, and return air duct 33. A portion of the return air is exhausted from the building by exhaust duct 34.

Control system 10 is also connected to demand meter 60 for monitoring power consumption within the building.

Figure 2:
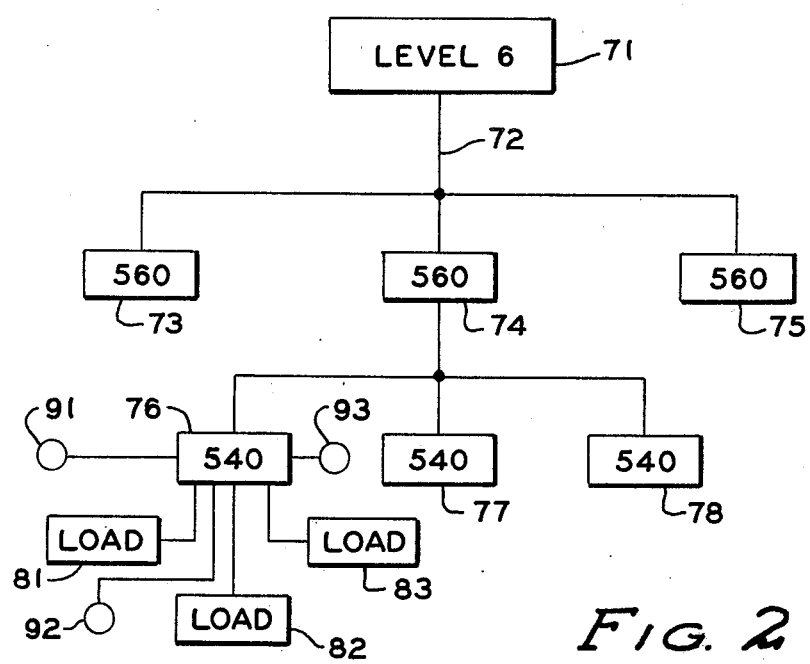
FIG. 2 shows one configuration for the control system shown in FIG. 1.

FIG. 2 shows one form which control system 10 may take. This system may, for example, be one of the Delta 5000 series of building automation control systems manufactured by Honeywell Inc. In such a system, a Honeywell Level 6 computer 71 is connected by way of communication bus 72 to a plurality of 560 data gathering panels 73, 74 and 75. Each 560 data gathering panel, such as data gathering panel 74, may in turn be connected to a plurality of 540 data gathering panels 76, 77 and 78. Each 540 data gathering panel, such as data gathering panel 76, forms the main interface between the building automation control system and such loads as loads 81, 82 and 83 which are the fans of FIG. 1. In addition, data gathering panel 76 may also be connected to zone sensors 91, 92 and 93 associated with loads 81, 82 and 83. The Level 6 computer 71 communicates in binary format with the 560 DGPs which in turn communicate in binary format with the 540 DGPs. Thus, the Level 6 is capable of reading the inputs provided by the sensors connected to the 540 DGPs and can, based upon the information received from these sensors, control the loads which are connected to these 540 DGPs.

Figure 3:
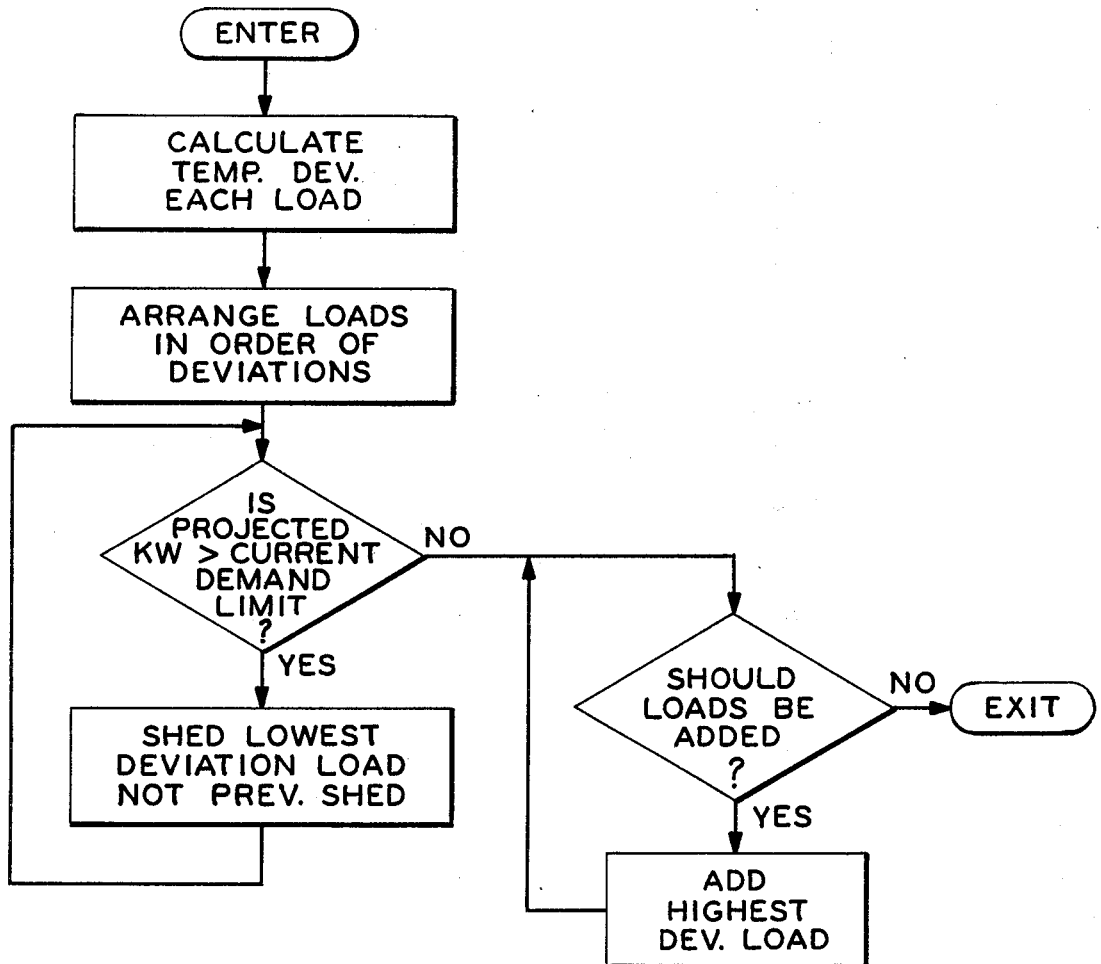
FIG. 3 is a flow chart showing how the loads of a building are shed in order to maintain power consumption below a predetermined level.

FIG. 3 shows the way in which the Level 6 can control the loads based upon the information provided by the sensors for load shedding operation. The load shedding operation is entered periodically to determine whether and in what order loads should be shed. The first step in the operation is to calculate the condition (e.g. temperature) deviation for the zones or representative zone (one zone may be taken as representative if there are more than one zone associated with a load or fan system) associated with each load. This deviation may be an average deviation for plural zones to represent the actual temperature that is compared to the desired temperature determined to be the "comfort index". Next, the loads are arranged in the order of the deviations determined by the previous step. Then, if it is determined that the projected demand (the rate of power usage for a demand interval) will exceed the current demand limit by a calculated amount, the load affecting or supplying the zone or space having the lowest deviation between the actual condition and the desired condition is first shed. If the demand represented by this load does not exceed this calculated amount, the next load representing the space having the next lowest deviation is shed and so on until the amount of demand shed is greater than the calculated amount.

However, if the projected demand is below the current demand limit, the control system must determine whether or not loads which may have previously been shed should be added. For example, if the projected demand is too near the current demand limit or if no loads have been previously shed, then loads will not be added, and the control system terminates the load shed routine until it is reentered. If, however, adding a load will not push the projected demand above the current demand limit, loads which have previously been shed will be added, with the load associated with the space having the most deviation between the actual condition and the desired condition (the most uncomfortable previously shed load) added first. If the projected demand will still be sufficiently below the current demand limit, the load associated with the space having the next highest deviation is added and so on until no more loads can be added.

Figure 4:
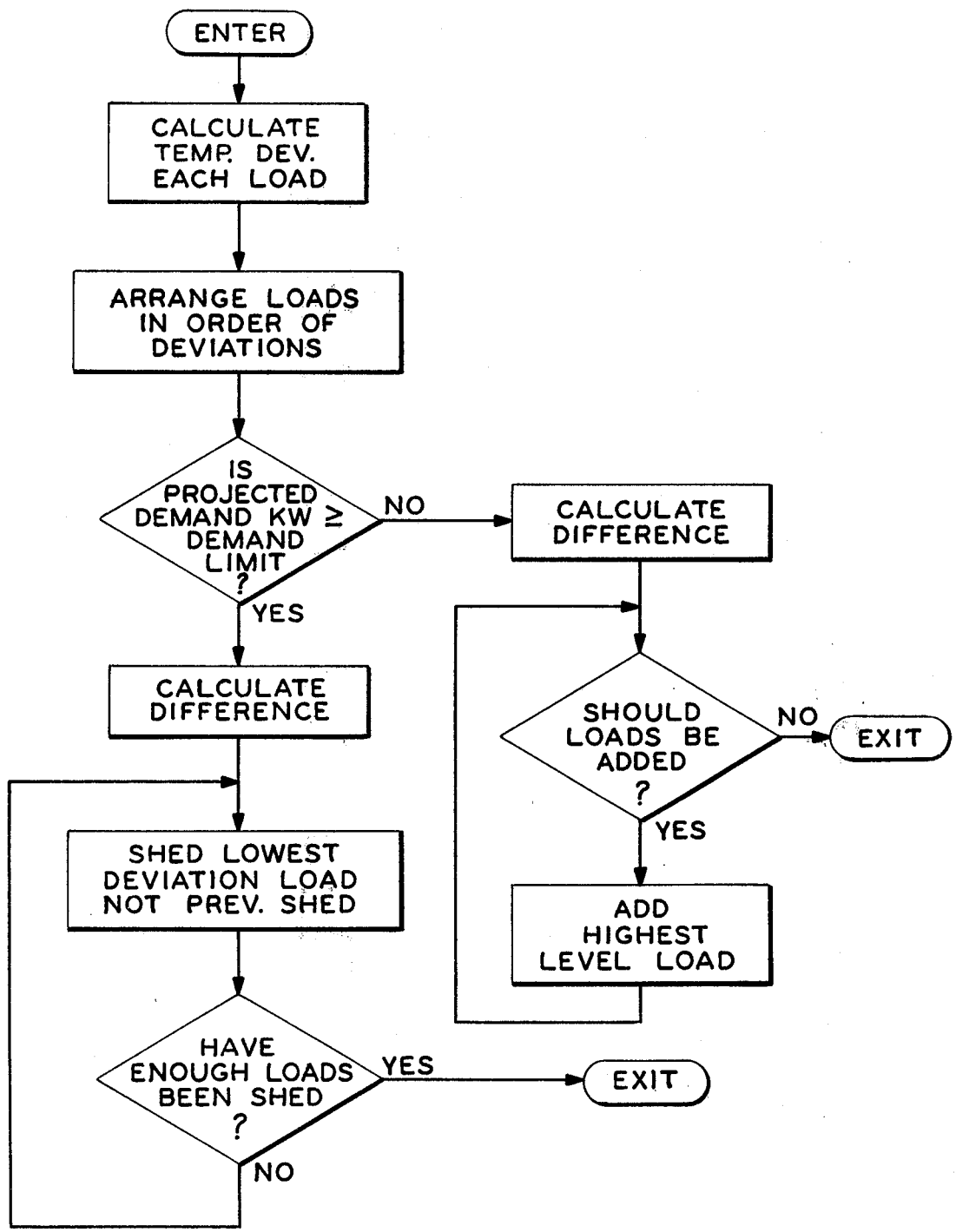
FIG. 4 shows an alternative way of shedding these loads.

FIG. 4 represents an operation which is an alternative to that shown in FIG. 3. After the temperature deviation for the zones affected or controlled by each load is determined and after the loads are arranged in order of the deviations, if the projected demand is below the current demand limit, the difference between the projected demand and the current demand limit is determined and loads will be added in order of those affecting or controlling the zones having the highest deviation first until the added demand nearly equals the calculated difference, i.e. the difference between the projected demand and the current demand limit is reduced as much as it can be without the projected demand exceeding the demand limit.

On the other hand, if the projected demand is greater than or equal to the demand limit, again the difference between the projected demand and the demand limit is calculated, and loads are shed in order of those loads affecting the zones having the lowest deviation between the actual condition and the desired condition being shed first until the shed demand equals or exceeds the calculated difference, i.e. enough loads have been shed that the projected demand will be reduced to a value below the current demand limit.

In this control system, it may be advantageous in deciding whether or not the projected demand is below the current demand limit to determine the slope at which the actual energy consumption is changing in order to establish the amount of load to add or shed while yet avoiding the breeching of the current demand limit. In this way, based upon the rate at which energy consumption changes, loads can be shed before the end of the demand actual interval to avoid exceeding the demand limit. Going the other way, the rate of decrease of actual energy consumption can be used to maintain comfort as high as possible. Additionally or in the alternative, the predetermined level may be established below the demand limit to provide a margin of error to ensure that the limit will not be exceeded.

FIG. 5 shows an example of how eight loads can be sorted and rearranged according to the operations shown in FIGS. 3 and 4. Column 1 shows the load numbers, these loads affecting space conditions. Column 2 shows the comfort index, i.e. the desired temperature or humidity for the zones with which the load is associated. Column 3 shows the actual measured condition in the zones associated with each of the loads, and column 4 calculates the absolute value of the deviation between the comfort index of column 2 and the measured condition of column 3. Column 5 shows the sorted deviation values and column 6 shows the reordered loads corresponding to the sorted deviation values of column 5. Thus, when loads are to be shed, they are shed in order of the lowest deviation first and when the loads are to be added they are added in order of the highest deviation first.

The embodiments of the invention in which an exclusive property or right is claimed are defined as follows:

1. A load shedding system for shedding loads within a building to maintain power demand below a predetermined limit, said loads affecting actual conditions in associated zones within said building with respect to desired conditions, said system comprising:
   condition sensing means for sensing said actual conditions in said zones of said building;
   connecting means adapted to be connected to said loads within said building; and,
   control means connected to said condition sensing means and to said connecting means for shedding said loads in order of those loads affecting those zones having the least deviation between said actual conditions and said desired conditions being shed first and those loads having the most deviation being shed last to maintain said demand below said predetermined limit.

2. The system of claim 1 in which said control means comprises means for adding loads in order of those loads affecting those zones having the highest deviation between said actual conditions and said desired conditions being added first and those loads having the least deviation being added last to the extent that said demand can be maintained below said limit.

3. A load shedding system for shedding loads within a building to maintain power demand within the building below a demand limit, said loads affecting the temperature in associated zones within said building with respect to the desired temperatures for said zones, said system comprising:
   temperature sensing means for sensing said temperatures in said zones of said building;
   connecting means adapted to be connected to said loads within said building; and,
   control means connected to said temperature sensing means and to said connecting means for shedding said loads in order of those loads affecting those zones having the least deviation between the actual temperatures and the desired temperatures being shed first and those loads having the most deviation being shed last to maintain said demand below said limit.

4. The system of claim 3 in which said control means comprises means for adding loads in order of those loads affecting those zones having the highest deviation between said actual temperatures and said desired temperatures being added first and those loads having the least deviation being added last to the extent that said demand can be maintained below said limit.

5. A load shedding system for shedding loads within a building to maintain power demand within the building below a demand limit wherein said loads which are shed are those loads which control the temperatures in zones supplied with air treated by said loads, said loads having a desired temperature to which said actual temperature is controlled, said system comprising:
   temperature sensing means for sensing said actual temperatures in said zones of said building; and,
   control means connected to said temperature sensing means and to said loads for shedding said loads in order of those loads controlling those zones having the least deviation between the actual temperatures and the desired temperatures being shed first and those loads controlling those zones having the most deviation being shed last to maintain said demand below said limit.

6. The system of claim 5 in which said control means comprises means for adding loads in order of those loads affecting those zones having the highest deviation between said actual temperatures and said desired temperatures being added first and those loads having the least deviation being added last to the extent that said demand can be maintained below said limit.

* * * * *